(12) United States Patent
Kaneko

(10) Patent No.: US 6,758,077 B2
(45) Date of Patent: Jul. 6, 2004

(54) MANUFACTURING METHOD OF CYLINDER

(75) Inventor: Ryuichi Kaneko, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/213,440

(22) Filed: Aug. 7, 2002

(65) Prior Publication Data

US 2003/0046803 A1 Mar. 13, 2003

(30) Foreign Application Priority Data

Aug. 10, 2001 (JP) ......................................... 2001-243163

(51) Int. Cl.$^7$ ............................................. B21D 22/00
(52) U.S. Cl. ............................. 72/85; 72/84; 72/370.01; 72/370.1; 72/370.24
(58) Field of Search ........................ 72/84, 85, 370.01, 72/370.02, 370.04, 370.1, 370.24, 370.25, 101

(56) References Cited

U.S. PATENT DOCUMENTS 6,038,901 A * 3/2000 Stein et al. ..................... 72/85
6,615,476 B1 * 9/2003 Yamanaka et al. ............. 29/516

FOREIGN PATENT DOCUMENTS

| JP | 56-105827 | * 8/1981 | ................... 72/101 |
| JP | 05-065930 | 3/1993 | |
| JP | 5-208234 | * 8/1993 | ..................... 72/85 |
| SU | 1189542 | * 11/1985 | ..................... 72/85 |
| SU | 1407617 | * 7/1988 | ..................... 72/85 |

* cited by examiner

Primary Examiner—Ed Tolan
(74) Attorney, Agent, or Firm—Rabin & Berdo, P.C.

(57) ABSTRACT

A method of manufacturing a cylinder, includes a step of inserting a cored bar 2 into piping material 1 having a reduced inner radius at one end and supporting the end of the cored bar with the reduced radius section of the piping material 1. The method also includes rotating the piping material 1 and the cored bar 2, displacing the piping material 1 in an axial direction while passively rotating at least one roller 3 compressing the outer periphery of the piping material 1 and applying a spinning operation to the piping material while pressuring and retaining the piping material between the cored bar 2 and the roller 3. Thus the thickness of the middle section of the piping material is made less than the thickness of the end sections by moving the roller into a position closer to the cored bar in the middle section than in the end sections of the piping material. In this manner, processing of the cylinder can be effectively performed without wastage of the material thereof.

3 Claims, 3 Drawing Sheets

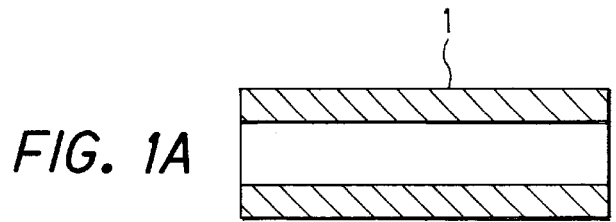
FIG. 1A
FIG. 1B
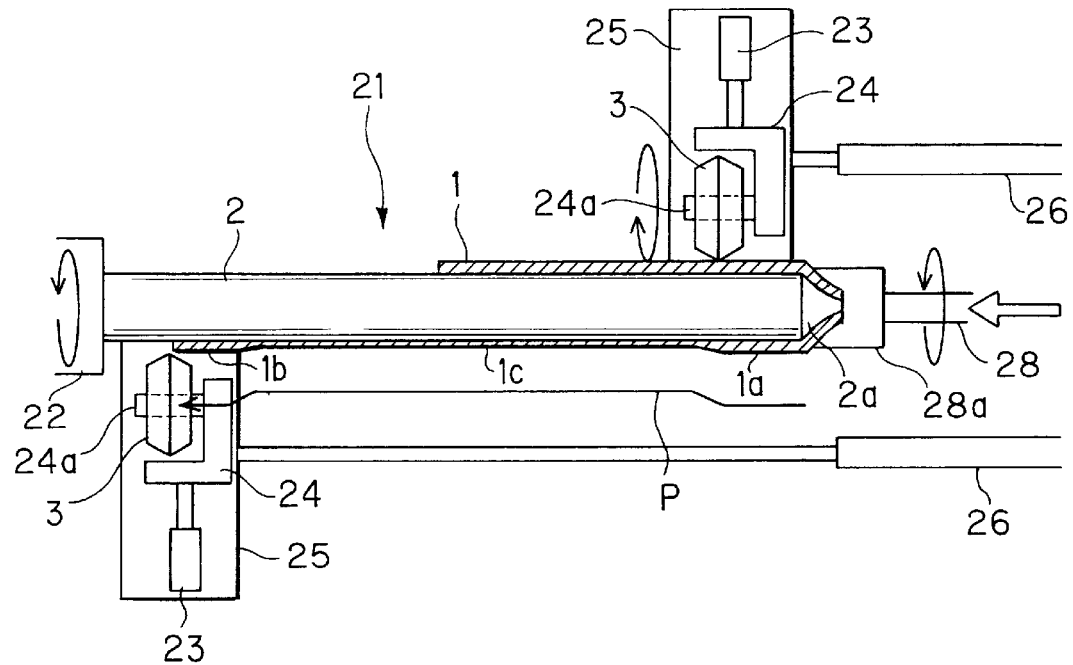
FIG. 2

MANUFACTURING METHOD OF CYLINDER

FIELD OF THE INVENTION

This invention relates to a method of manufacturing a cylinder which can be adapted to a front fork providing an internal damping device on a motorcycle for example.

BACKGROUND OF THE INVENTION

JP-A5-65930 is known as an example of a front fork for a motorcycle.

This front fork comprises an outer tube in which an inner tube is inserted in to slide freely and a damper is arranged to rise from the bottom of the inner tube. Thick sections are formed on both ends of the cylinder comprising the damper by the threadable engagement of the cylinder with a cylinder head and a valve body. A cutting operation is applied to reduce the thickness of the middle section between the thick sections of the cylinder in order to decrease the overall component weight.

However since a reinforcing material is used in order to maintain the required cylinder strength, the problem arises that the cost of the reinforcing material is high due to its high strength. Furthermore since a section of this expensive material is cut away, material is wasted and it is difficult to reduce costs. In addition, productivity is adversely affected due to the fact that the number of processing steps is increased and problems arise with respect to the adhesion between the materials.

SUMMARY OF THE INVENTION

It is therefore an object of this invention to provide a method of manufacturing a cylinder which displays improved processing characteristics, improved adhesion and avoids wastage of materials.

The method according to this invention is a method of manufacturing a cylinder comprising, a step of inserting a cored bar into piping material having a reduced inner radius at one end, a step of supporting the reduced radius section of the piping material with the inserted tip of the cored bar, and a step of spinning the piping material in which rotating the piping material and the cored bar, displacing passively rotating one or a plurality of rollers in an axial direction while compressing the outer periphery of the piping material, and pressuring and retaining the piping material between the cored bar and the roller; wherein the thickness of the middle section of the piping material is made less than the thickness of the end sections by moving the roller into a position closer to the cored bar in the middle section than in the end sections of the piping material.

BRIEF DESCRIPTION OF THE DRAWINGS

FIGS. 1A and 1B are sectional views of piping material used in a first embodiment of this invention, wherein FIG. 1A is before processing and FIG. 1B is after processing.

FIG. 2 illustrates a spinning operation applied by this invention.

DESCRIPTION OF THE PREFERRED EMBODIMENTS

Figure 3:
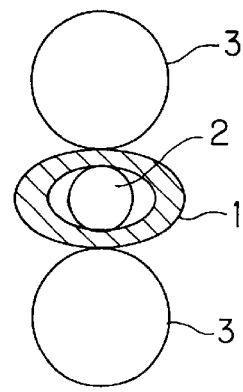
FIG. 3 is a sectional view of a spinning operation.

In order to describe the invention in greater detail, the preferred embodiments will be outlined below with reference to the accompanying drawings.

This invention relates to an optimal cylinder manufacturing method for a cylinder stored in the front fork of a motorcycle for example.

As shown in FIGS. 1A and 1B, the method of manufacturing a cylinder according to this invention comprises a step of constricting one end 1a of piping material 1 and compressing the inner radius of the end 1a into a tapering shape, a step of inserting a cored bar 2 into piping material 1 and supporting the end of the cored bar 2 with the small radius section of the piping material as shown in FIG. 2, and a step that includes spinning of the piping material 1 in which the piping material 1 and the cored bar 2 are rotated, displacing one or a plurality of passively rotating rollers 3 in an axial direction so as to compress the outer periphery of the piping material 1, and pressuring and retaining the piping material 1 between the cored bar 2 and the roller 3. Furthermore in the spinning operation, the trail P of displacement of the roller 3 approaches the cored bar 2 in a range corresponding to the middle section of the piping material 1.

This process will be described in greater detail hereafter. Firstly in a step as shown in FIGS. 1A and 1B, referring to FIG. 1A, the piping material 1 is formed with a uniform and relatively high thickness along its entire axial dimension. This thickness is described in detail hereafter, and is slightly thicker than the thickness at both ends of the cylinder.

As shown in FIG. 1B, the inner radius of one end of the piping material 1, the right end 1a in this example, is compressed into a tapering shape by a spinning operation illustrated in FIG. 2 for example. However, the process for compressing the end 1a is not limited to a spinning operation and other processes may be used.

Referring to FIG. 2, the method of applying the spinning operation to the piping material 1 will be described.

A spinning device 21 applies a spinning operation to the outer periphery oft he piping material 1. For this purpose, firstly a cored bar 2 is inserted into the piping material 1. The cored bar 2 has a diameter which is slightly smaller than the piping material 1. The tip 2a of the cored bar 2 is compressed into a tapering shape. The piping material 1 is supported on the cored bar 2 with the tip 2a of the cored bar 2 projecting to abut with the small radius section 1a of the piping material 1.

The end of the cored bar 2 is fixed to the rotation shaft of a motor 22. The cored bar 2 is rotated by the rotation of the motor 22 and the piping material 1 rotates together with the cored bar 2 as a result of friction. A head 28a provided on a shaft 28 coaxial to the motor 2 comes into contact with the end 1a of the piping material 1. The piping material 1 is supported on the cored bar 2 since the head 28a presses the end 1a in an axial direction.

One or a plurality of rollers 3 (for example three rollers) are disposed at equal intervals on the outer peripheral of the piping material 1. Each roller 3 is disposed on the side on which the end 1a of the piping material 1 is provided. Each roller 3 is mounted to rotate freely on the rotation shaft 24a of the support arm 24 mounted on a first drive cylinder 23. The rotation shaft 24a of the roller 3 is disposed in parallel to the axial center of the cored bar 2.

Each drive cylinder 23 is compressed or expands in a direction which is orthogonal to the axial center of the cored bar 2. When the cylinder 23 expands, the distance between the roller 3 and the cored bar 2 is reduced. When the cylinder 23 displaces in the opposite direction, the distance between the rollers 3 and the cored bar 2 increases.

The drive cylinder 23 is fitted on a table 25. The table 25 (support) is guided to slide parallel to the axial center of the cored bar 2. A second drive cylinder 26 is connected to the table 25. The table 25 displaces parallel to the axial center of the cored bar 2 together with compression or expansion of the cylinder 26. As a result, the roller 3 displaces in an axial direction parallel to the cored bar 2 due to expansion or compression of the drive cylinder 26.

When the first drive cylinder 23 has expanded and each roller 3 makes strong contact with the outer periphery of the piping material 1, if the cored bar 2 is rotated, each roller 3 is passively rotated by the rotation of the piping material 1 which rotates together with the cored bar 2. In this state, when the second drive cylinder 26 expands, the table 25 is displaced and each roller 3 is slowly displaced by the right end of the piping material towards the left end. Consequently the piping material 1 becomes strongly sandwiched between the cored bar 2 and the roller 3 with the result that the thickness of the piping material 1 is reduced and the length of the piping material 1 gradually expands in an axial direction.

At this time, the tip 2a of the cored bar 2 supports the compressed section on the end 1a of the piping material 1 and supports a large load with respect to the axial direction of the piping material 1 due to the spinning operation.

During the period in which the roller 3 displaces in the axial direction of the cored bar 2, the stroke amount of the cylinder 23 can be regulated in order to reduce the distance between the roller 3 and the cored bar 2. In this manner, the thickness of the piping material 1 undergoes a corresponding reduction in those regions in which the pressing force from each roller 3 increases.

Thus in this example, the distance between the roller 3 and the cored bar 2 is regulated in order to increase the thickness on both ends (end sections) 1a, 1b of the piping material 1 and decrease the thickness in the middle section 1c between the ends 1a, 1b.

Figure 4:
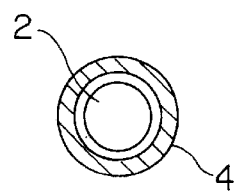
FIG. 4 is a sectional view of a cylinder after the spinning operation.

As shown in FIG. 3, during the spinning operation, when two rollers 3 on opposite sides of the piping material 1 are provided, the piping material 1 is regulated to a predetermined thickness by being pressed into an elliptical shape against the cored bar 2 by the two rollers 3. However, when the rollers 3 are removed after completion of the spinning operation, the cylinder 4 finally takes a circular shape by reverting from the elliptically deformed shape as shown in FIG. 4.

However during this spinning operation, in the tapered border region between the thick section on both ends 1a, 1b and the thin section in the middle section 1c, the piping material 1 swells inwardly due to the degree of processing by the roller 3 and the cored bar 2, that is to say, due to the difference in the deforming processes.

Figure 5:
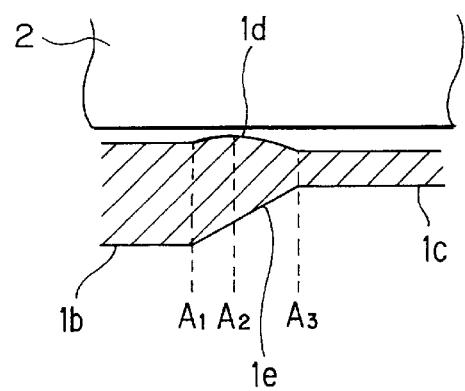
FIG. 5 shows the modification to the shape of the member after the spinning operation.

More precisely, as shown in FIG. 5, a projection 1d is produced due to the difference in the degree of processing on the inner face of the contact section 1e with the thick section on both ends 1a, 1b and the thin section of the middle section 1c. It is not preferred that the projection 1d impedes sliding of the piston in the cylinder. However in reality, the region of thickness formed at both ends 1a, 1b is positioned outside of the effective stroke region in which the piston operates in the cylinder 4. Consequently, it does not impede the sliding operation of the piston under normal conditions. However when the damping cylinder is assembled, the existence of a projection 1d is not preferred since the piston is inserted through the opening on one end of the cylinder 4 and a projection 1d will impede such insertion.

Figure 6:
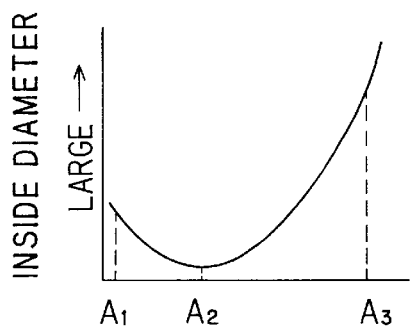
FIG. 6 shows the characteristics of the amount of deformation.

As shown in FIG. 6, the amount of change in the internal diameter between the end 1a (A1) of the piping material 1 and the middle section 1c (A3) takes a maximum value at the connecting section 1e (A2).

Figure 7:
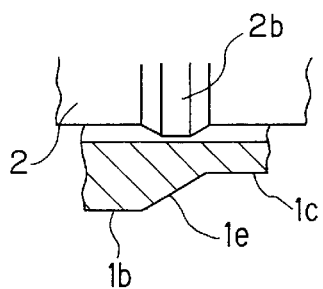
FIG. 7 shows a section of cored bar used in the spinning operation.

As shown in FIG. 7, a large diameter land 2b is preformed on the outer periphery of the cored bar 2 at a position corresponding to the connecting section 1e with the piping material 1. The land 2b is formed with dimensions corresponding to the amount of deformation in the projection 1d. In this manner, the land 2b presses upwardly from the inside of the piping material 1 to prevent the formation of a projection 1d on the inner face of the piping material 1 during the spinning operation. Consequently the inner face of the cylinder 4 is smooth and does not constitute an impediment to the sliding of the piston.

Another embodiment of the method of manufacturing a the cylinder 4 enabling a suitable variation to the internal diameter of the cylinder will be described hereafter with reference to FIG. 8.

Figure 8:
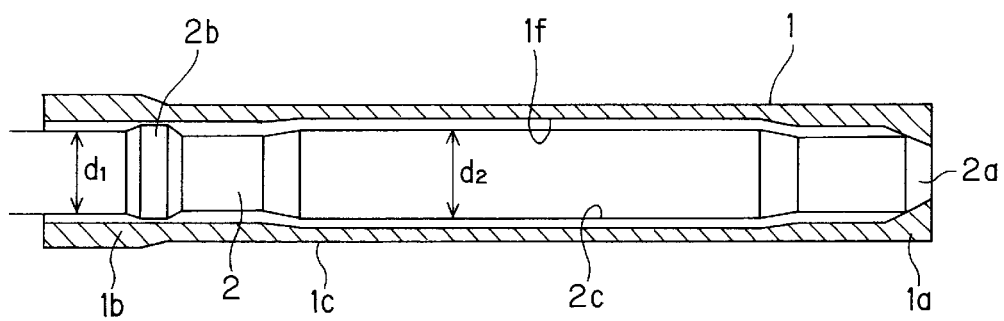
FIG. 8 shows the cored bar used in the spinning operation according to another embodiment of this invention.

In FIG. 8, a large diameter land 2c is formed in an axial direction on the middle section of the cored bar 2. The land 2c is of a required length and most importantly is formed with a large diameter. The diameter d2 of the land 2c is larger than the diameter d1 of other sections and is set in the range of 0.05–0.07 mm. The internal diameter of the cylinder 4 is set in a range of 20–32 mm for example.

Thus the land 2c protrudes less than the land 2b which is provided with respect to the contact section 1e of the piping material 1.

Thus when the spinning operation is performed using the cored bar 2, the middle of the cylinder 4 corresponds at localized positions to the thin section 1f with an internal diameter increased by only 0.05–0.07 mm.

In this manner, when the internal diameter of the middle section of the cylinder 4 is increased by a fixed minute amount, when the piston slides in the cylinder 4, the annular space about the outer periphery of the piston increases in sections in which the internal diameter of the cylinder 4 is large. In this manner, friction acting on the piston is decreased and sliding motion is facilitated. Furthermore, it is possible to reduce the damping force generated in the damping cylinder by allowing flow of working oil through the annular space.

When the piston passes through the thin section 1f formed with a large inner radius, that is to say, in regions in which the damping cylinder has a long stroke in either direction from a central position, the inner radius of the cylinder decreases and the annular space decreases. In this manner, the generated damping force of the damping cylinder can be increased.

When the amount of expansion of the internal diameter in the thin section 1f is a minute amount of the order of 0.05–0.07 mm, sliding motion of the piston is not impeded at positions at which the internal diameter from the thin section 1f varies. Thus according to this invention, since the thickness of the cylinder is varied along its length by a spinning operation, all the piping material can be used without waste. This enables reductions in costs without wasting damping cylinder materials due to cutting operations for example. Furthermore it is possible to improve productivity, component adhesion and processing operations.

Although the invention has been described above by reference to certain embodiments of the invention, the invention is not limited to the embodiments described above. Modifications and variations of the embodiments described above will occur to those skilled in the art, in the light of the above teachings.

What is claimed is:

1. A method of manufacturing a cylinder, comprising:

a step of inserting a cored bar into piping material having a reduced inner radius at one end;

a step of supporting the reduced radius section of the piping material with an inserted tip of the cored bar; and a step that includes spinning the piping material, in which the piping material and the cored bar are rotated, displacing at least one passively rotating roller in an axial direction while compressing the outer periphery of the piping material, and pressuring and retaining the piping material between the cored bar and the at least one passively rotating roller, wherein a middle section of the piping material is made thinner than end sections thereof by moving the roller into a position closer to the cored bar in the middle section than in the end sections, and the cored bar includes a large diameter land at a connecting section between the thinner middle section and the end sections, the land suppressing inward swelling of an inner face of the piping material at the connecting section.

2. A method of manufacturing a cylinder, comprising:

a step of inserting a cored bar into piping material, having a reduced inner radius at one end;

a step of supporting the reduced radius section of the piping material with the inserted tip of the cored bar; and a step that includes spinning the piping material, in which the piping material and the cored bar are rotated, displacing at least one passively rotating roller in an axial direction while compressing the outer periphery of the piping material, and pressuring and retaining the piping material between the cored bar and the at least one passively rotating roller, wherein a middle section of the piping material is made thinner than end sections thereof by moving the roller into a position closer to the cored bar in the middle section than in the end sections, and the cored bar has a large radius section, and small radius end sections at opposite sides of the large radius section, the large radius section having an enlarged diameter in relation to diameters of the small radius sections, the large radius section being provided at a position corresponding to the thinner middle section of the piping material.

3. A method of manufacturing a cylinder, comprising:

a first step of inserting a cored bar into piping material having a reduced inner radius at one end;

a second step of supporting the reduced radius section of the piping material with the inserted tip of the cored bar; and a third step that includes spinning the piping material, in which the piping material and the cored bar are rotated, displacing at least one passively rotating roller in an axial direction while compressing the outer periphery of the piping material, and pressuring and retaining the piping material between the cored bar and the at least one passively rotating roller to obtain a cylinder with an internal diameter in a range of 20 to 32 mm, wherein the cored bar has a large radius section, and small radius end sections at opposite sides of the large radius section, the large radius section having a diameter in relation to diameters of the small radius sections that is larger by an amount in a range of 0.05 mm and 0.07 mm, the large radius section being provided at a position corresponding to a middle section of the piping material, the middle section of the piping material between end sections thereof;

said third step including moving the roller into a position closer to the cored bar in the middle section of the piping material than in the end sections thereof, so that the middle section of the piping material is made thinner than the end sections of the piping material such that an internal diameter in the middle section of the piping material becomes 0.05 mm to 0.07 mm greater than an internal diameter in the end sections thereof.

* * * * *